H. LA CASSE.
SHAFT HANGER.
APPLICATION FILED MAR. 30, 1904.
931,129.
Patented Aug. 17, 1909.
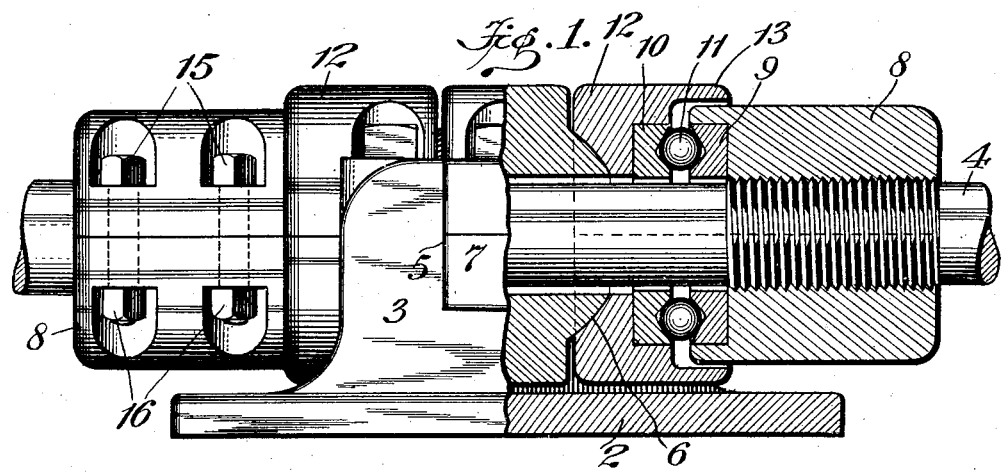
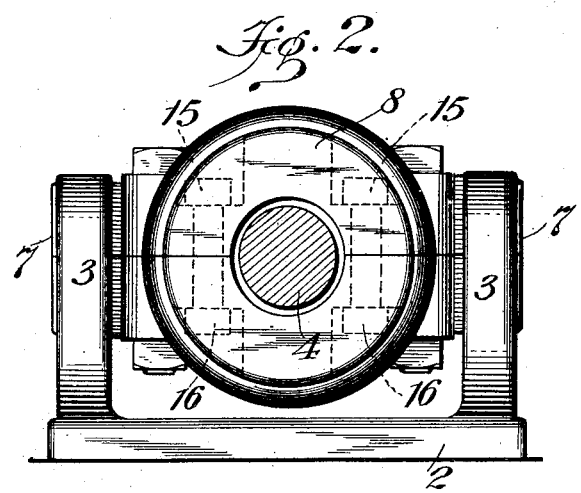
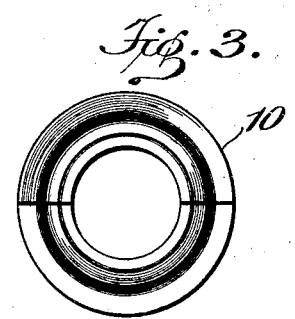
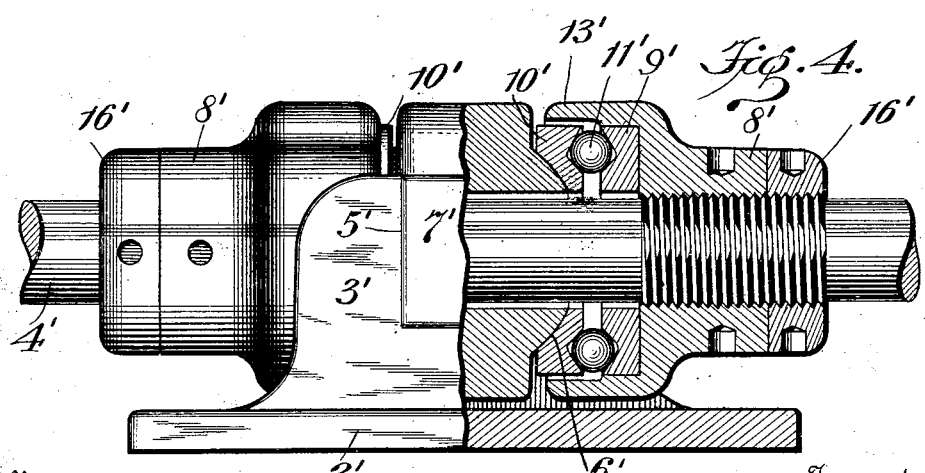
Witnesses
A. K. Appleman
E. W. Faith
Inventor
Henry La Casse
By his Attorney

UNITED STATES PATENT OFFICE.

HENRY LA CASSE, OF AUBURN, NEW YORK.

SHAFT-HANGER.

No. 931,129.   Specification of Letters Patent.   Patented Aug. 17, 1909.

Application filed March 30, 1904. Serial No. 200,679.

*To all whom it may concern:*

Be it known that I, HENRY LA CASSE, a citizen of the United States, and resident of Auburn, in the county of Cayuga and State of New York, have invented certain new and useful Improvements in Shaft-Hangers, of which the following is a specification.

This invention relates to improvements in shaft-hangers, and particularly to the hangers and bearings for shafts of marine engines, which bearings receive both lateral and end thrusts, and the principal feature of the invention is a hanger and bearing adapted to permit such a shaft to move slightly in a direction transverse to the axis of its supporting bearing when a lateral thrust is applied to such shaft. As this lateral thrust may be exerted in any direction transverse to the axis of the bearing by which the shaft is supported, I also prefer to construct the bearing in such a manner as to permit the shaft to move in different directions transverse to the axis of the bearing, and preferably universally about a center in such axis. In addition to providing for this lateral movement of the shaft, so that it may yield slightly when excessive lateral thrust is applied thereto, it is also necessary in this type of bearing, as in others, in order to obtain the best results, to provide antifriction bearing surfaces for the shaft, this being preferably done by supporting the shaft on circuits of balls supported between bearing surfaces which permit the balls to roll freely without sliding, under all conditions of speed and pressure; and hence a further object of my invention is to provide an improved antifriction or ball bearing which will permit the utmost freedom of movement of a shaft capable of yielding slightly when an excessive lateral thrust is applied thereto. This and other features of my invention relating to an improved construction of split-bearing, which may be removed and replaced without disturbing the position of the shaft, will be hereinafter more fully described and claimed.

In the drawings Figure 1 is a view in side elevation of one embodiment of my invention, portions of the structure being shown in section for clearness. Fig. 2 is an end elevation of the same. Fig. 3 is a detail of one of the split ball races. Fig. 4 is a sectional side elevation, similar to Fig. 1, of a modification of the invention.

Similar characters designate like parts in all the figures of the drawing.

The main feature of my improved bearing is a center bearing or support which carries the shaft and permits the shaft to move in a direction transverse to the axis of the bearing. This relative transverse movement may be in any direction, or in various directions, transverse to the axis of the bearing, and it may result either from the mode of mounting the center bearing or from the manner in which the shaft is supported by said center bearing, or from both. I prefer, however, to so organize these parts that the center bearing will be capable of moving relatively to its support and so that the shaft will be movable relatively to the center bearing, each of these movements being relative to the axis of the bearing as a whole. The former of these movements, that is to say, the relative movement of the center bearing upon its support or base, is usually a rectilinear one, while the movement of the shaft relative to the center bearing is preferably in the arc of a circle. Each of these movements will now be considered in detail with respect to the construction shown in Fig. 1. In said view 2 designates a base or support from which rise side pieces or vertical supports, such as 3. These vertical supports carry a center bearing member by which a shaft, such as 4, is supported so as to be capable of movement transverse to the axis of the bearing as a whole. This center bearing member is also preferably capable of moving in a similar manner, and for this reason is so mounted in the side supports 3—3, so as to slide cross-wise and vertically therein. In this construction these supports have two deep vertical guide-openings the walls of which are indicated at 5 in Fig. 1, and in these openings the center bearing member is so fitted as to be movable both in a vertical plane and cross-wise of the support proper. For this reason the center bearing member, which is designated generally by 6, has at opposite sides thereof projections, such as 7, in alinement with each other, which exactly fit the guide-openings 5 and constitute the supporting portions of the center bearing member, these projections being analogous to trunnions except that they do not turn in the side supports 3. It will be evident that this mode of mounting the center bearing member 6 on a support or base constitutes one means for permitting a slight yielding movement of a shaft supported by such center bearing member when a lateral thrust is applied to said shaft either in a vertical or a horizontal direction, and when a shaft carried by such a center bearing member has suitable antifriction or ball bearings interposed between it and the center bearing member, the friction and strain on the shaft will be reduced to a minimum.

In order that a shaft supported by such a center bearing member as that just described may respond quickly to a lateral thrust in any plane, I prefer to combine the shaft and center bearing member in such a manner as to permit a relative movement between them. I accomplish this result in this, the preferred construction, by making the center bearing member 6 in the form of a spherical bearing and mounting the shaft 4 so that it will turn on this spherical bearing member about the center of the sphere, which is in the axis of the bearing. In the construction shown in Fig. 1 the shaft 4 passes through and is clear of the center bearing member 6, which center bearing member has an opening or bore of considerably larger diameter than the diameter of the shaft, and this shaft has in fixed relation therewith outer bearings coacting with intermediate bearing-members provided with spherical sockets which in turn coact with the spherical center bearing member and permit the shaft to tip in any direction about the center of the sphere 6, so that the shaft has a limited universal movement about such point. The details of construction of these parts may vary greatly, but in this case the outer bearing-members, which are in fixed relation with the shaft, are internally threaded collars or collar-nuts, such as 8, recessed at their inner ends to receive ball-races, such as 9, which are driven thereinto. Corresponding ball-races 10, between which and the ball-races 9 circuits of balls, such as 11, are interposed, are driven in a similar manner into intermediate collars, such as 12, having openings or bores of considerably larger diameter than the diameter of the shaft 4, and also recesses to form guard-rings 13, which cover the balls and the joint between the outer and intermediate bearing-members. At their inner sides the collars 12 have spherical sockets corresponding in contour to the spherical periphery of the center bearing member 6 and in contact therewith.

In order to assure perfect rolling of the balls 11 and prevent any sliding action between them and their ball-races, the bearing surfaces of these ball-races are preferably constructed as shown in my prior patent No. 518,321, granted April 17, 1894, that is to say, the bearing points of these ball-races are in the surface of an imaginary cone the vertex of which is in the axis of the ball bearing formed by the ball-races and the interposed row of balls.

It is important in marine engineering to construct bearings in such a manner as to permit of their installation, removal and replacement or renewal without disturbing the shaft itself. For this reason all of the bearing members through which the shaft 4 passes are split in the center line of the bearing, that is to say, in the central horizontal plane. The parts so split are the center bearing member 6, the intermediate bearing-members formed by the collars 12 and the ball-races 10, and the outer bearing-members formed by the collar-nuts 8 and the ball-races 9. All of these parts are held together by suitable means, such for example as the bolts and nuts 15 and 16, in a manner which is well understood.

From the foregoing description it will be seen that the shaft 4 is entirely clear of the center bearing member 6 and also of the intermediate bearing-members, and that it is in fixed relation with the outer bearing-members only. These outer bearings are supported by the intermediate bearing-members through the interposed balls and the ball-races of the intermediate bearing-members, and the intermediate bearing-members are in turn supported by the center bearing member 6, which is supported by the base or main fixed element of the bearing. Hence the shaft itself is not in frictional bearing contact with any other part, all the bearing points for the shaft being in the ball-races 9 on which the balls 11 roll without sliding, thus permitting the shaft to turn with the least possible friction. When an excessive lateral thrust is applied to the shaft 4 it will be seen that the shaft will move in one or more directions transverse to the axis of the bearing, either in one or more straight lines or in an arc of a circle about the center of the spherical center bearing member 6, the lateral thrusts applied being such in some cases as to shift only the center bearing member on its support, while in other cases they are such as to impart a curvilinear or universal movement to the intermediate bearing-members on the spherical center bearing member 6.

In Fig. 4 I have illustrated a modification of my invention in which all of the parts are similar to those above described except that all of the bearing members through which the shaft passes are solid, instead of being split, as in Fig. 1, and except that the ball-races 10' have spherical sockets and are supported directly on the spherical center bearing member, instead of being driven into a holding-collar supported on the spherical bearing-member, as in Fig. 1. The outer bearing-members 8' are also somewhat different from those shown in Fig. 1 and are provided with guard-rings or flanges 13' corresponding to the guard-rings on the intermediate bearing-members in Fig. 1. Check-nuts, such as 16', are also shown in Fig. 4 for positively locating the outer bearing members.

What I claim is:

1. In a shaft hanger, a support therefor, ears formed upon the support, and provided with openings, a center bearing member provided with lugs disposed within the openings, and free to move vertically and crosswise relative to the support, the ends of said center bearing member being of substantially spherical design, intermediate bearing members embracing and movable angularly upon the spherical portion of said center bearing member, a shaft extending through and journaled upon the intermediate bearing members and free to oscillate therewith relative to the center bearing member, and outer bearing members rigid with the shaft and bearing upon the intermediate bearing members.

2. In a shaft hanger, a support, ears formed upon the support and provided with openings, a center bearing member provided with lugs disposed within the openings and free to move laterally relative to the support, convex extensions formed upon opposite sides of the bearing member, intermediate bearing members provided with concave faces proportioned to fit and oscillate upon the convex extensions, and outer bearing members arranged to move rotatively upon the intermediate bearing members.

3. In a device of the class described and in combination, a support, a center bearing member freely movable under shaft deflections in different directions mounted on said support, the ends of said center bearing member being of substantially spherical design, a shaft traversing said center bearing, end bearings fixed to said shaft on each side of said center bearing, and bearings disposed between said end and center bearings and provided with concave spherical faces, said faces engaging the ends of said center bearing member, whereby to permit oscillation of said shaft relative to said center bearing.

4. In a device of the class described and in combination, a support, a center bearing member freely movable under shaft deflections mounted in said support, said center bearing member having opposed spherical portions and spherical recessed bearings fixed to said shaft on each side of said center bearing, and forming a universal joint connection between said end bearings and said center bearing to permit free oscillation of said shaft relative to said center bearing.

5. In a device of the class described and in combination, a support, a center bearing member freely movable under shaft deflections mounted in said support, said center bearing having opposed recessed portions, end bearings fixed to said shaft on each side of said center bearing, and independent bearing blocks having concave spherical faces engaging with said center bearing between said end and center bearing, and providing a universal joint therewith.

6. In a device of the class described and in combination, a support, a center bearing member freely movable under shaft deflections mounted in said support, said center bearing member having opposed spherical members, end bearings fixed to said shaft on each side of said center bearing, independent bearing blocks having spherical recessed faces coöperating with said center bearing between said center and end bearings, whereby to provide a substantially universal joint and circuits of balls between said independent bearing blocks and said end bearings.

Signed at Auburn in the county of Cayuga and State of New York this 29th day of February A. D. 1904.

HENRY LA CASSE.

Witnesses:
G. B. LONGSTREET,
E. M. JOHNSTON.